United States Patent [19]
Imbrock et al.

[11] Patent Number: 5,966,214
[45] Date of Patent: Oct. 12, 1999

[54] GAUGE FOR MEASURING GLASS THICKNESS AND GLASS PANE SPACING

[75] Inventors: Mark A. Imbrock, Maumee, Ohio; Jeffrey A. Simpson, Peoria, Ill.

[73] Assignee: Electronic Design To Market, Inc., Toledo, Ohio

[21] Appl. No.: 09/076,678

[22] Filed: May 12, 1998

[51] Int. Cl.$^6$ .................................................... G01B 11/06

[52] U.S. Cl. .......................................................... 356/382

[58] Field of Search ..................................... 356/382, 246, 356/381, 239.4; 33/706, 707

[56] References Cited

U.S. PATENT DOCUMENTS

| | | | |
|---|---|---|---|
| 1,756,785 | 4/1926 | Gallasch | 356/382 |
| 4,848,913 | 7/1989 | Greiner | 356/382 |
| 5,054,927 | 10/1991 | Garves | 356/382 |
| 5,748,091 | 5/1998 | Kim | 356/382 |

OTHER PUBLICATIONS

Product brochure for Air Space Laser by FDR Desigs, Inc., Sept. 8, 1994.

Product brochure for GLASS_CHEK glass pane & air gasp meters.

Product brochure for Merlin Lazer gauge.

*Primary Examiner*—Robert H. Kim
*Assistant Examiner*—Zandra V. Smith
*Attorney, Agent, or Firm*—MacMillan, Sobanski and Todd, LLC

[57] ABSTRACT

A laser gauge for measuring the thickness of glass panes and the spacing between glass panes in a sealed insulated window. A laser beam is directed at a predetermined angle to a first glass surface. Reflections from the glass surfaces pass through a gauge housing, through a slot in an adjustable slide, and impinge on a matted finished surface of thin scale. The housing and the slide are formed from materials having a predetermined coefficient of friction relative to each other to provide smooth movement to said slide in said housing. The scale is sufficiently thin to avoid false readings from internal reflections within the scale. The scale is adjustable on the slide to align the first reflection with a reference indicia. For each glass pane and for each pane spacing, the slide is adjusted so that a first surface reflection aligns with the reference indicia and a second surface reflection is compared with indicia on the scale to determine the thickness of the glass pane or the glass pane spacing. A separate set of indicia may be provided on the scale for measuring the spacing between glass panes.

10 Claims, 3 Drawing Sheets

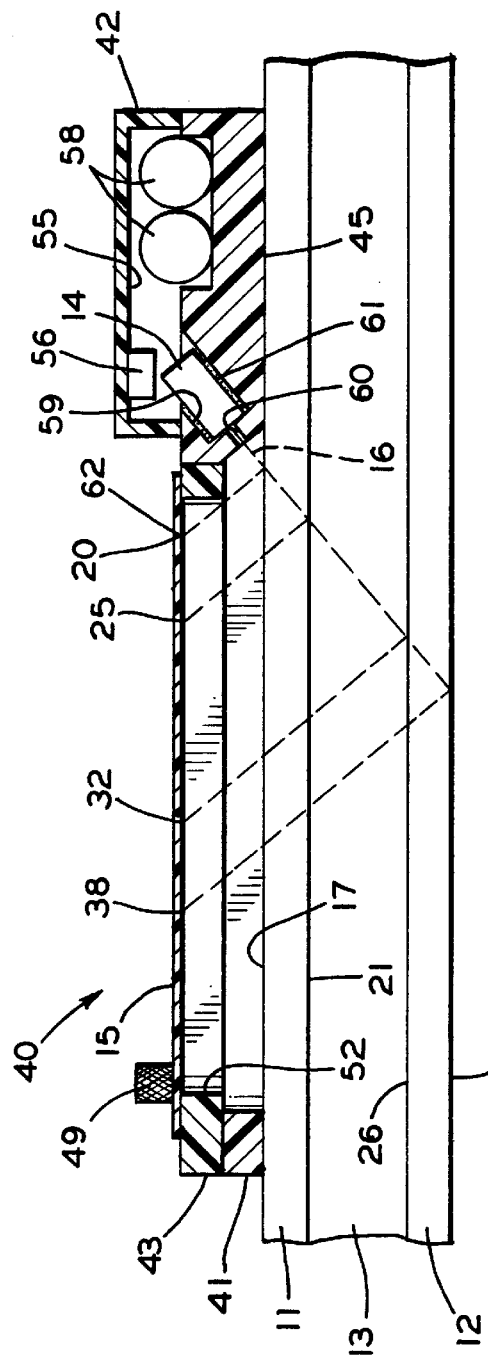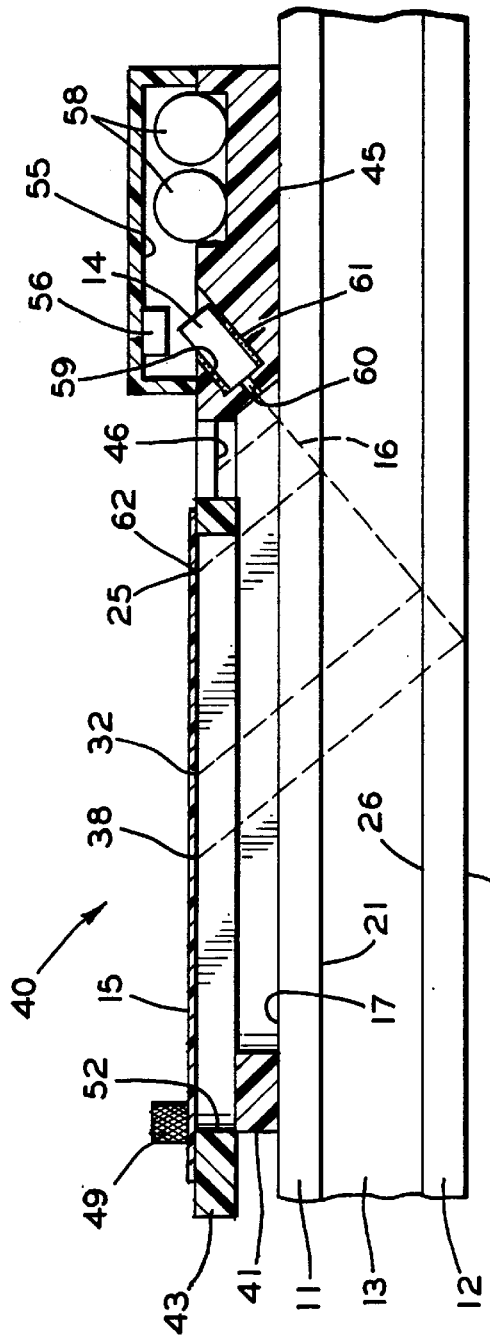

GAUGE FOR MEASURING GLASS THICKNESS AND GLASS PANE SPACING

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

It is frequently desirable to measure the thickness of single pane glass plate products such as single panes of glass, mirror products, tinted glass, and bullet proof glass. It also is desirable to measure the thickness of individual panes of composite glass products such as laminated glass products, and to measure the glass thickness and glass spacings of multiple pane, sealed insulated glass windows. These measurements are desirable for the glass product manufacturer, for glass product purchasers, and for building inspectors to verify that glass products are within specifications.

One method for measuring the thickness of glass plates or panes is to place a mirror on one side of the pane and a gauge on the opposite side of the pane, as shown in U.S. Pat. 4,848,943. The gauge is positioned so that when the user looks down a sight tube, the reflection of a target on an adjustable scale is seen in the mirror. When the scale is adjusted to line the target with reference marks, the glass thickness is indicated on the scale. The gauge also can be used to measure the total thickness of multiple pane windows. If the glass thickness is known, the glass pane spacing can then be determined. However, it cannot measure individual glass pane thicknesses or glass pane spacing in a multiple pane insulated glass window.

It also is known in the art that glass pane thickness and the spacings between multiple panes of glass may be measured by directing a laser beam at a known angle, for example, at an angle of about 45°, to a surface of the glass product. A portion of the laser beam is reflected and a portion is refracted at each glass surface. The thickness of the glass layers and of any spacing between the layers is determined by impinging the reflections on a surface and measuring the spacings on the surface between the reflections. Different scales are required for measuring the glass thickness and for measuring the spacing between panes of glass due to differing indexes of refraction at the surfaces between glass and gas.

In one known gauge for measuring glass pane thickness and spacing, the laser source is mounted in a housing which is positioned against a glass surface during a measurement. A laser beam is directed at an angle to the surface and the beam reflections impinge on a scale on a slide which is moveable in a slot in the housing for adjustment towards and away from the laser source in a plane parallel to the glass surface. The scale slide may be adjusted to align a zero reference mark with a first reflection from the glass surface which the housing abuts. Additional reflections show on the scale for each additional glass surface interface. The reflections will occur at interfaces between glass and gas, and where layers of glass are laminated together. Separate slides with separate scales are provided for measuring glass plate thickness and for measuring the spacing between panes of glass due to differences in refraction of the laser beam between glass and gas.

In a modified prior art gauge for measuring glass pane thickness and glass pane spacing, a slide is provided with a central section on which the reflected laser beam impinges. Different scales are provided on opposite sides of the central section, one for measuring glass thickness and one for measuring glass pane spacings. The slide moves in a dovetail slot and is spring loaded to eliminate looseness in the slot. For strength, the slide has a thickness of about one eighth inch (about 32 mm) or more. In order to clearly see the reflected laser beam, it is necessary for the user to position his or her eye substantially in line with the reflected beam. If the laser beam is directed at an angle of 45° to the glass, then the eye also must be positioned along a line at an angle of about 45° to the gauge in order to clearly see the reflections. In bright light, it can be difficult to read the gauge. Further, multiple reflections tended to occur at both surfaces of the slide. These reflections can lead to false measurements.

In still another prior art gauge for measuring glass thickness and glass pane spacing, reflections of a laser beam from the glass-to-gas interfaces impinge on a photosensitive array. A microprocessor determines the locations of the reflections and provides a digital readout of the thickness of each glass pane and of the spacings of multiple glass panes. This gauge is considerably more expensive than a gauge in which the thickness and spacing measurements are read directly from reflections on scales.

It is desirable to provide a low cost gauge for measuring glass thickness and glass pane spacing which is easy to use and to read and in which false readings from internal reflections in the slide are not present.

BRIEF SUMMARY OF THE INVENTION

The invention is directed to an improved gauge for measuring glass pane thickness and glass pane spacing. The gauge includes a housing which mounts a laser beam source. When the housing is positioned against a glass surface and the laser source is energized, a laser beam is directed at an angle of, for example, about 45° to the glass surface. The reflections of the beam pass back through open slots through the housing and a slide mounted in the housing, and impinge on a thin film scale mounted on the slide. The scale is sufficiently thin to avoid internal reflections which can cause false readings. Separate sets of indices for indicating glass pane thickness and the spacing between glass panes are printed on the thin film scale. The surface of the film is translucent so that the impinging laser reflections are clearly indicated next to the measurement indicia. The film is mounted on a slide which can be moved along a path parallel to the glass surface to permit aligning any laser beam reflection with a zero reference. Preferably, the position of the film is adjustable on the slide so that a reflection from the glass surface against which the gauge is abuts can be aligned with a zero reference when the slide is located at a retracted position.

Accordingly, it is an object of the invention to provide an accurate gauge for measuring glass pane thickness and for measuring the spacing of glass panes in multiple pane insulated glass windows.

Other objects and advantages of the invention will become apparent from the following detailed description of the invention and the accompanying drawings.

BRIEF DESCRIPTION OF THE DRAWINGS

FIG. 4 is a cross-sectional view taken along line 4—4 of FIG. 2; and

FIG. 5 is a cross-sectional view, similar to FIG. 4, except with the slide slightly extended form its retracted position.

DETAILED DESCRIPTION OF THE INVENTION

Figure 1:
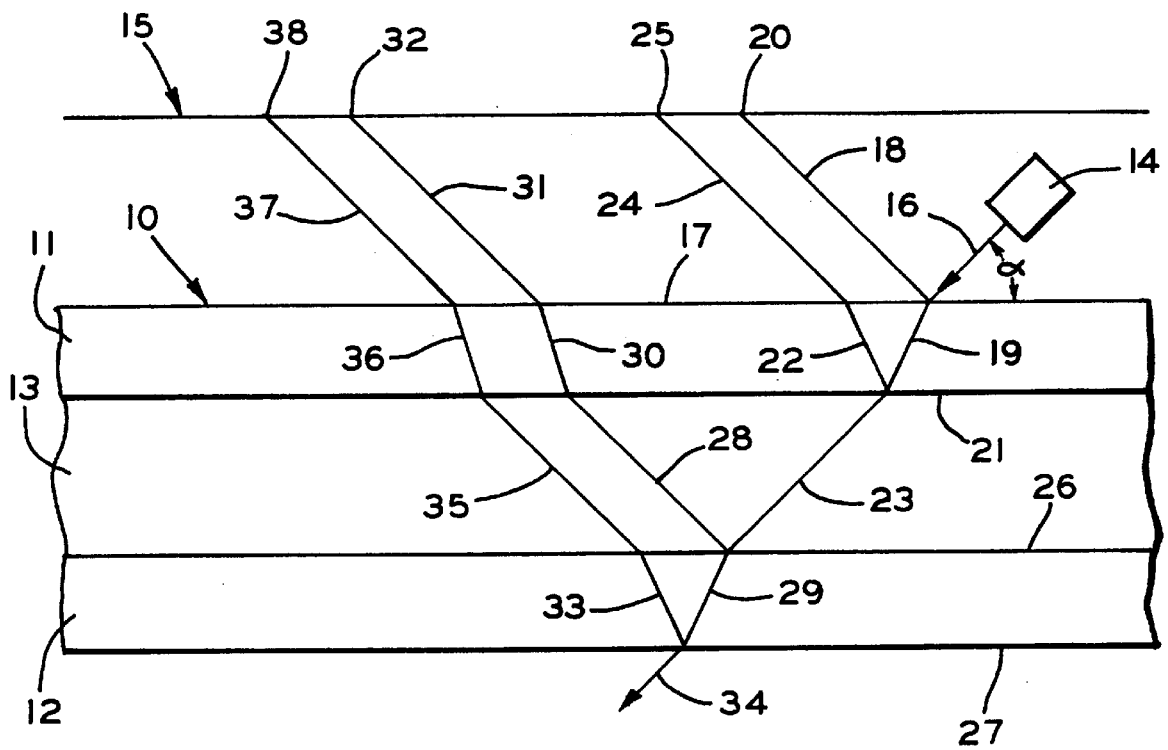
FIG. 1 is a diagrammatic view illustrating the principle for measuring glass thickness and glass pane spacing using laser beam reflections at glass surfaces.

FIG. 1 is a diagrammatic view illustrating the operating principal for a gauge according to the invention. The illustration shows a fragmentary section of a sealed insulated glass window assembly 10 which consists of two glass panes 11 and 12 separated by a space 13 filled with air or another gas, a laser light source 14, and a scale or surface of incidence 15 for laser beam reflections. The gauge operates by directing a laser beam 16 from the laser source 14 at a predetermined angle to a surface 17 on the glass pane 11 nearest the laser source 14. The angle may be, for example, 45°. A portion 18 of the beam 16 is reflected to the scale 15 and a portion 19 is refracted as it enters the glass pane 11. The angle of the reflected beam portion 18 relative to the surface 17 will be the same as the angle of incidence of the beam 16 to the surface. The reflected beam portion 18 impinge on the scale 15 at a point 20, which becomes a zero reference for measuring the thickness of the glass pane 11.

The glass pane 11 has a second surface 21 which is impinged by the beam 19. A portion 22 of the beam 19 is reflected at the surface 21 and a portion 23 is refracted as it enters the air space 13. The reflected beam 22 is refracted to form a beam 24 at the glass surface 17. The beam portions 18 and 24 will be parallel so long as the glass surfaces 17 and 21 are parallel. The beam 24 impinges on the scale 15 at a point 25. The scale 15 is provided with a set of indicia marking distances from the reference point 20. The indicia is calibrated so that the indicia at the point 25 corresponds to the thickness of the glass pane 11. It should be noted that the spacing of indicia will be a function of the angle α that the laser beam 16 strikes the surface 17. As the angle a is decreased, the spacing between the points 20 and 25 will increase for a given thickness of the glass pane 11. If the thickness of only a single pane of glass is being measured, only the points 20 and 25 will show on the scale 15.

The glass pane 12 has two surfaces 26 and 27. When the beam 23 impinges on the surface 26, a portion 28 is reflected and a portion 29 is refracted into the pane 12. The reflected portion 28 is refracted at the surface 21 to form a beam 30 in the glass pane 11 and is further refracted at the surface 17 to form a beam 31 which impinges on the scale 15 at a point 32. A portion of the beam 29 in the glass pane 12 is reflected at the surface 27 to form a beam 33 and a portion is refracted to form a beam 34 which exits the glass window assembly 10. The beam 33 is refracted at the surface 26 to form a beam 35, the beam 35 is refracted at the surface 21 to form a beam 36, and the beam 36 is refracted at the surface 17 to form a beam 37 which impinges on the scale 15 at a point 38. So long as the surfaces 26 and 27 of the pane 12 are parallel, the spacing between the points 32 and 38 corresponds to the thickness of the glass pane 12. The thickness of the pane 12 is determined using the same scale indicia as was used for measuring the thickness of the glass pane 11. Due to refraction between glass and air or other gas filling the space 13 between the panes 11 and 12, a different scale indicia is required for measuring the space 13, as represented by the spacing between the points 25 and 32. It will be noted that so long as the surfaces 17, 21, 26 and 27 from which portions of the laser beam 16 are reflected are parallel, the laser beam 16 and the refracted and reflected laser beam portions will lie in a plane.

Figure 2:
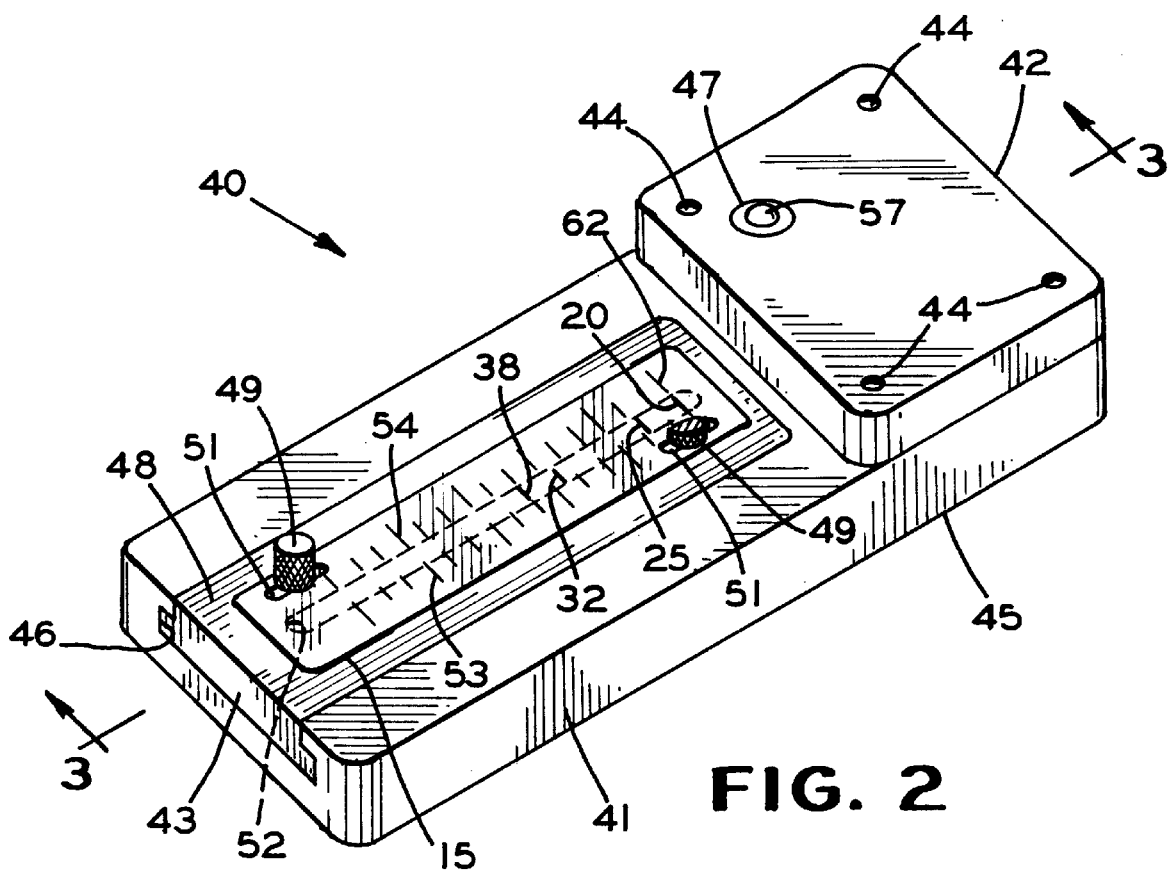
FIG. 2 is a perspective view of a gauge for measuring glass pane thickness and glass pane spacing according to a preferred embodiment of the invention.

Referring to FIG. 2 of the drawings, a gauge 40 is illustrated according to a preferred embodiment of the invention for measuring the thickness of glass panes and for measuring the spacing of glass panes in multiple pane insulated windows. The gauge 40 includes a housing 41, a cover 42 and a slide 43. The cover 42 is removably secured to the housing 41, for example, with a plurality of screws 44. The housing 41 is formed with a flat bottom surface 45 which is designed to abut a surface of a glass pane while making thickness and spacing measurements. The slide 43 snugly fits into and slides in a T slot 46 formed in the housing 41. The T slot 46 extends parallel to a line formed by a plane parallel to the flat housing surface 45 and the plane of the laser beam and its reflections. The housing 41, the cover 42 and the slide 43 may be made from various known materials including plastics and metal. Preferably, the housing 41 and the cover 42 are formed from Plexiglas which is an acrylic material available from Rohm and Haas Company, and the slide is formed from Delrin which is an acetal plastic available from E. I du Pont de Nemours and Company. The coefficient of friction between these materials allows the slide 43 to slide smoothly in the T slot 46 without falling from the T slot 46.

Figure 3:
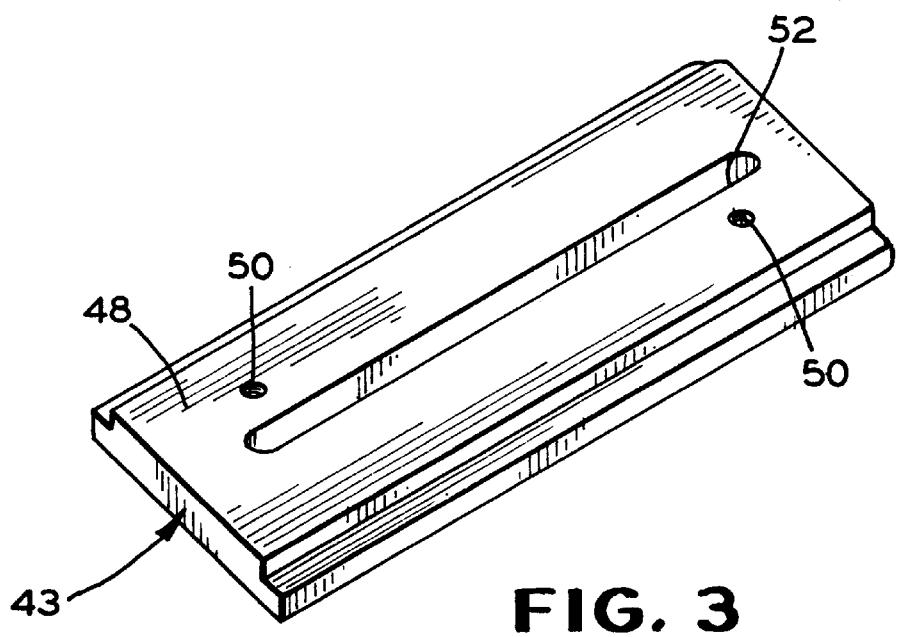
FIG. 3 is a perspective view of the adjustable slide for the gauge of FIG. 2 for mounting a thin scale which indicates the thickness and spacing.

Referring now to FIGS. 2–4, a flat, elongated scale 15 is secured to a top surface 48 on the slide 43 with two or more screws 49. The screws 49 engage threaded openings 50 in the slide 43. Preferably, the screws 49 are of a type which can be loosened and tightened by hand without the need for tools. The screws 49 may be, for example, of a type having an enlarged knurled head which can be easily grasped for loosening and tightening. The screws 49 also may be used to facilitate moving the slide 43 in the housing slot 46. The screws 49 extend through elongated openings 51 in the scale 50. By loosening the screws 49, the elongated openings 51 permit the scale 15 to be moved in a longitudinal direction on the slide 43 for calibration. The scale 15 extends over an open elongated slot 52 which passes through the slide 43 over the majority of the length of the slide 43 and through the housing 41.

The scale 15 is formed from a strong thin transparent material with a translucent surface which will diffuse the laser reflections to allow them to be easily seen without needing to position an eye in alignment with the laser beam reflections. Preferably, the scale comprises a base formed from a sheet of a strong material such as Lexan, a polycarbonate resin available from General Electric Company. A matted finish polyester film, for example, a Mylar film available from E. I. du Pont de Nemours and Company, is attached to the Lexan base for diffusing the reflections. Preferably, the polyester film has a dual matted finish, i.e., matted on both sides. The Lexan has polished surfaces to prevent degradation of the laser beam reflections and is sufficiently thin as to not produce significant internal reflections of the laser beam which can result in false readings. One or more sets of indicia may be printed on the scale 15, with two sets 53 and 54 illustrated. The indicia 53 and 54 may be calibrated, for example, so that one set indicates glass pane thicknesses and the other set indicates glass pane spacings. Different scales 15 may be provided for providing, for example, a choice of imperial measurements or metric measurements. Optionally, the indicia also may include markings for standard glass thicknesses and glass pane spacings.

Turning now to FIGS. 2–5, a cavity 55 is formed between the cover 42 and the housing 41. The cavity 55 encloses the laser source 14, a normally open switch 56 which is manually operated with a push button 57 for turning on the laser source 14, suitable batteries 58 for powering the laser source 14, and related wiring (not shown). So long as the switch button 57 is manually pushed, the batteries are connected to and activate the laser source 14. Preferably, the push button 57 is slightly recessed in a button guard 47 to prevent accidental actuation. The laser source 14 includes the laser light generator and the circuitry necessary for operation packaged either as an integral unit, as shown, or as separate components. A preferred laser source 14 is a commercially available visible laser diode module having a 660 NM wavelength output.

The laser source 14 is mounted in a bore 59 in the housing 41. A small, generally rectangular slot opening 60, preferably about 0.025 inch by 0.219 inch (about 0.635 mm by 5.563 mm) is formed in the bottom of the bore 59 for shaping and passing the laser beam 16. The slot opening 60 helps form sharp edges on the laser beam reflections and to shape the reflections striking the scale 15 to form lines. The bore 59 is formed slightly larger than the diameter of the laser source 14 to permit alignment of the laser source 14. As previously indicated, changes in the angle of the laser beam 16 relative to the flat bottom surface 45 of the gauge 40 will change the spacing between the reflection points 20, 25, 32 and 38 on the scale 15. In assembling the gauge 40, the laser source 14 can be retained in the bore 59 with a small amount of adhesive which will allow aligning the laser source 14. The angle of the laser source 14 can be adjusted so that the spacing between the reflection points 20 and 25 correspond with the scale indices for a known thickness glass pane 11. Once aligned, the laser source 14 can be sealed in place, for example, with an epoxy 61.

FIGS. 4 and 5 illustrate operation of the gauge 40. For simplicity, the laser beams are shown as straight lines without the effects of refraction at the glass-to-gas interfaces. The slide 43 is initially positioned in a retracted position in the housing slot 46 and the gauge 40 is positioned against the surface 17 of the glass pane 11. While the laser source 14 is turned on, the screws 49 are loosened and the scale 15 is moved until the reflection point 20 from the surface 17 aligns with a zero reference indicia 62, and the screws 49 are tightened. Comparing the reflection point 25 for the surface 21 with the appropriate indicia 53 or 54 for glass, the thickness of the glass pane 11 is read. The slide 43 may be extended in the housing slot 46 until the reflection point 25 for the surface 21 aligns with the reference indicia 62, as shown in FIG. 5. The spacing between the glass panes 11 and 12 is read by comparing the reflection point 32 for the surface 26 with the appropriate indicia 53 or 54 for air. Similar readings may be made for the thickness of the glass pane 12, and of any additional glass panes and spacings. For laminated glass, there will be reflections at the surfaces between the laminated glass panes which will show on the scale 15.

Since the scale 15 is quite thin, there will be no significant internal reflections of the laser beam within the scale 15 which can provide false readings. Also, since the scale 15 is provided with a dual matted texture surface, the incidence points 20, 25, 32 and 38 for the laser beam reflections will be readily apparent without the need for the user to align his or her eye with the reflections 18, 24, 31 and 37 (FIG. 1) to clearly read the gauge 40, as with some prior art gauges.

It will be appreciated that various modifications and changes may be made to the above described preferred embodiment of a gauge for measuring glass thickness and glass pane spacing without departing from the scope of the following claims.

We claim:

1. A gauge for measuring glass pane thickness and glass pane spacings comprising a housing having a surface adapted to abut a surface of a glass pane, a laser light source mounted in said housing to emit a laser beam from said housing surface at a predetermined angle to said housing surface whereby the laser beam is reflected from surfaces of any glass pane parallel to said housing surface, said laser beam and any laser beam reflections from glass surfaces parallel to said housing surface lying in a first plane, a slide mounted in said housing for movement in a longitudinal direction along a line formed by the intersection of a plane parallel to said housing surface and said first plane, an elongated opening through said housing and through said slide is located for passing reflections of said laser beam in said first plane, and a thin scale having measurement indicia marked thereon mounted on said slide over said slide opening for impingement by laser beam reflections in said first plane, said scale being sufficiently thin to prevent false measurements from internal reflections in said scale and being sufficiently translucent for diffusing impinging laser beam reflections whereby points of impingement by laser beam reflections are clearly indicated.

2. A gauge for measuring glass pane thickness and glass pane spacings, as set forth in claim 1, and wherein said scale includes a film having dual matted surfaces for dispersing laser beam reflections to clearly indicate impingement by laser beam reflections.

3. A gauge for measuring glass pane thickness and glass pane spacings, as set forth in claim 1, wherein said scale has at least one elongated opening extending in a direction parallel to said line, and including a screw passing through said elongated scale opening and releasably engaging said slide whereby the position of said scale on said slide is adjusted by loosening said screw.

4. A gauge for measuring glass pane thickness and glass pane spacings, as set forth in claim 1, and wherein said housing includes a T slot extending parallel to said line, and wherein said slide is mounted to move in said T slot.

5. A gauge for measuring glass pane thickness and glass pane spacings, as set forth in claim 4, and wherein said housing and said slide are formed from different materials which have a predetermined coefficient of friction relative to each other to provide smooth movement to said slide in said T slot.

6. A gauge for measuring glass pane thickness and glass pane spacings, as set forth in claim 5, and wherein said housing is formed from an acrylic material, and said slide is formed from an acetal material.

7. A gauge for measuring glass pane thickness and glass pane spacings, as set forth in claim 6, and wherein said scale is formed from a polyester film having a dual matted finish attached to a clear polycarbonate resin layer.

8. A gauge for measuring glass pane thickness and glass pane spacings, as set forth in claim 1, and including a rectangular orifice in said housing through which the laser beam is passed to impart generally a line shape to reflections impinging on said scale.

9. A gauge for measuring glass pane thickness and glass pane spacings comprising a housing having a surface adapted to abut a surface of a glass pane, a laser light source mounted in said housing to emit a laser beam from said housing surface at a predetermined angle to said housing surface whereby the laser beam is reflected from surfaces of any glass pane parallel to said housing surface, said laser beam and any laser beam reflections from glass surfaces parallel to said housing surface lying in a first plane, an elongated opening through said housing located for passing reflections of said laser beam in said first plane, and a thin scale having measurement indicia marked thereon mounted for impingement by laser beam reflections passing through said elongated housing opening, said scale being sufficiently thin to prevent false measurements from internal reflections in said scale and being sufficiently translucent for diffusing impinging laser beam reflections whereby points of impingement by laser beam reflections are clearly indicated.

10. A gauge for measuring glass pane thickness and glass pane spacings, as set forth in claim 9, and including a rectangular orifice in said housing through which the laser beam is passed to impart generally a line shape to reflections impinging on said scale.

\* \* \* \* \*